US012540538B2

(12) United States Patent
Bell

(10) Patent No.: US 12,540,538 B2
(45) Date of Patent: Feb. 3, 2026

(54) MONITORING FRICTION OF A FRACTURE TREATMENT FLUID

(71) Applicant: ProFrac Holdings II, LLC, Willow Park, TX (US)

(72) Inventor: Brian James Bell, Morgantown, WV (US)

(73) Assignee: ProFrac Holdings II, LLC, Willow Park, TX (US)

( * ) Notice: Subject to any disclaimer, the term of this patent is extended or adjusted under 35 U.S.C. 154(b) by 0 days.

(21) Appl. No.: 18/394,465

(22) Filed: Dec. 22, 2023

(65) Prior Publication Data

US 2025/0207488 A1 Jun. 26, 2025

(51) Int. Cl.
*E21B 43/26* (2006.01)
*G01N 19/02* (2006.01)

(52) U.S. Cl.
CPC ......... *E21B 43/2607* (2020.05); *G01N 19/02* (2013.01)

(58) Field of Classification Search
CPC .............................. E21B 43/2607; C09K 8/34
USPC ..................................................... 166/250.01
See application file for complete search history.

(56) References Cited

U.S. PATENT DOCUMENTS 9,097,634 B2 8/2015 Yang et al.
11,175,209 B1 11/2021 Svarczkopf
2009/0090504 A1* 4/2009 Weightman ........... E21B 43/267 166/250.01
2011/0239744 A1 10/2011 Auradou et al.
2013/0041587 A1 2/2013 Gomaa et al.
2018/0038177 A1* 2/2018 Leuchtenberg ......... E21B 17/01
2018/0163510 A1* 6/2018 Cleven .................... E21B 43/26
2019/0024468 A1* 1/2019 McLeod ............... E21B 47/024

OTHER PUBLICATIONS

Matovic, Gojko , et al., "Slickwater Friction Reducer Performance Evaluation and Application", Paper presented at the SPE Improved Oil Recover Conference, Virtual, Apr. 25-29. SPE-209377-MS, 2022, 12 pages.

(Continued)

*Primary Examiner* — William D Hutton, Jr.
*Assistant Examiner* — Ashish K Varma
(74) *Attorney, Agent, or Firm* — Henry Patent Law Firm PLLC

(57) ABSTRACT

In a general aspect, the friction of a fracture treatment fluid is monitored during a hydraulic fracture treatment. In some aspects, a system includes a conduit that communicates a fracture treatment fluid from a pump system toward a well system during a hydraulic fracture treatment. The conduit includes interior and exterior surfaces. A first channel extends from a first interior port defined by the interior surface to a first exterior port defined by the exterior surface. A second channel extends from a second interior port defined by the interior surface to a second exterior port defined by the exterior surface. The system includes a differential pressure sensor that measures a pressure difference between the first and second exterior ports of the conduit during the hydraulic fracture treatment. The system includes a control unit that determines a friction of the fracture treatment fluid based on the pressure difference and the distance.

18 Claims, 3 Drawing Sheets

(56) References Cited

OTHER PUBLICATIONS

Nizamidin, Nabijan , et al., "Universal Behavior of Polyacrylamide-Based Friction Reducers: Achieving Quantitative Lab Evaluation to Analytical Scale-up Model Development for Field Performance Prediction", Paper presented at the Unconventional Resources Technology Conference, Houston, Texas, USA, Jul. 26-28. URTeC: 5541, 2021, 20 pages.
Tomson, Ross C, et al., "Development of a Universal Ranking for Friction Reducer Performance", Paper presented at the SPE Hydraulic Fracturing Technology Conference, The Woodlands, Texas, USA, Jan. 24-26, 2017, 13 pages.
"Rosemount 3051 Pressure Transmitter", Product Data Sheet, 00813-0100-4001, Rev WE, Apr. 2023, 112 pages.

* cited by examiner

MONITORING FRICTION OF A FRACTURE TREATMENT FLUID

BACKGROUND

The following description relates to monitoring friction of a fracture treatment fluid, such as during a hydraulic fracture treatment.

Fracture treatments have been used to stimulate the transfer of hydrocarbon resources from a subterranean formation to a wellbore. Fracture treatments typically introduce a pressurized fracturing fluid into the subterranean formation through a wellbore. The pressurized fracturing fluid can fracture the subterranean formation, and proppant material in the fracturing fluid can help stabilized the fractures.

DETAILED DESCRIPTION

Figure 1:
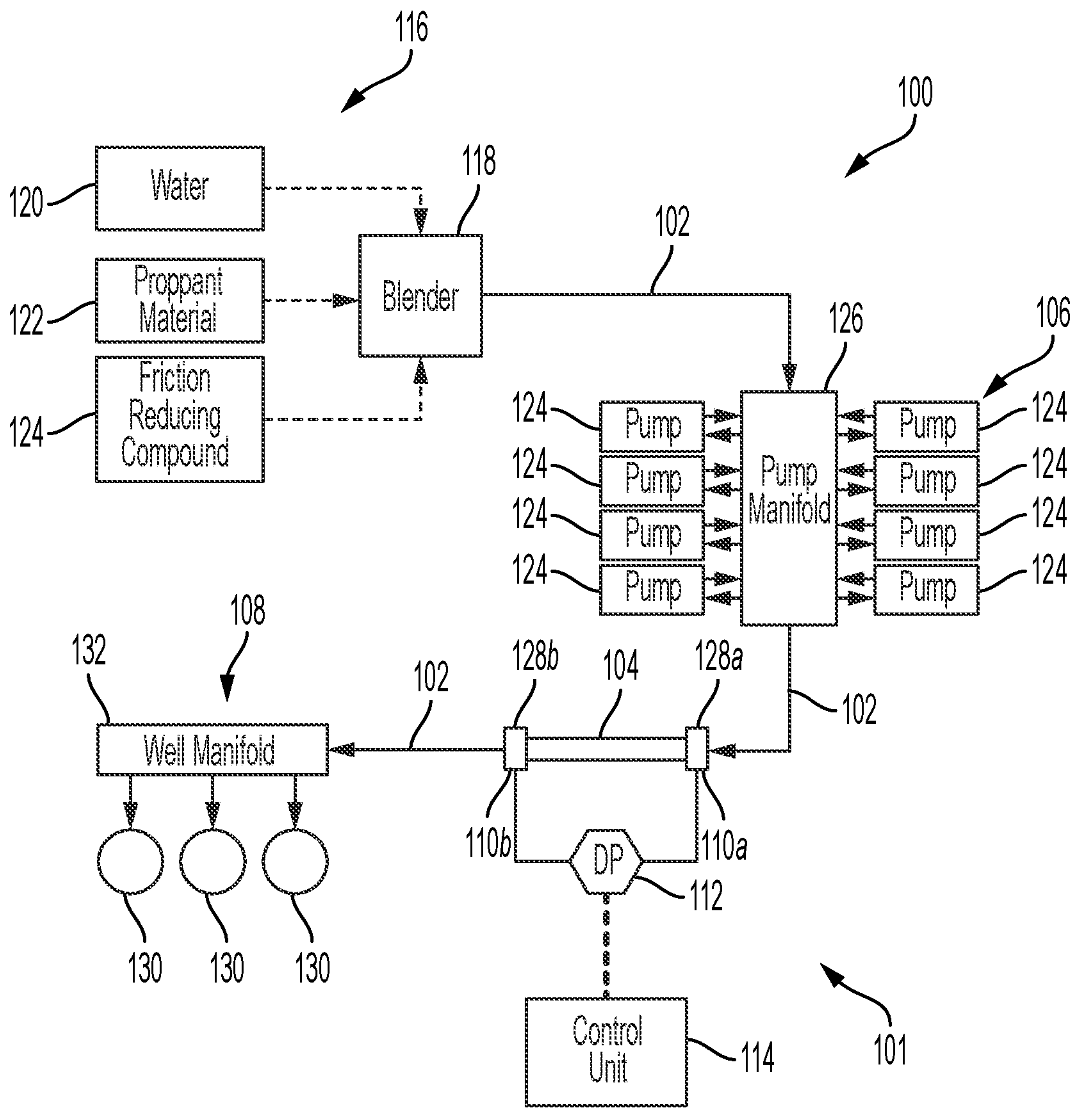
FIG. 1 is a schematic diagram of an example fracture treatment system.

In a general aspect, the friction of a fracture treatment fluid is monitored during a hydraulic fracture treatment. In some cases, friction can be handled as a live variable on a fracture treatment job, and dynamic changes in friction can be quantified and processed. Monitoring the friction of fracture treatment fluid in real time during a fracture treatment can provide advantages and improvements that can increase the efficiency and efficacy of the fracture treatment in some cases. For example, measured values of friction can be compared to job specifications to support quality control or diagnostics. In some implementations, additives can be adjusted in the fracture treatment fluid based on the measured friction. For instance, friction reducers can be increased or decreased in response to the friction of the fracture treatment fluid being below or above a target value. In some cases, such adjustments can be automated, for example, by a feedback loop or otherwise. In some implementations, more accurate measurements of pipe friction can be achieved by monitoring the friction of the fracture treatment fluid. Surface data may then be used to determine more accurate perforation efficiencies. Moreover, accurate knowledge of the friction variable of the fracture treatment fluid will also allow a more accurate calculation of net pressure, making Nolte-Smith plots a more accurate real time evaluation tool.

In some implementations, a fracture treatment system includes a measurement subsystem that monitors the friction of the fracture treatment fluid as it flows through a conduit. The measurement subsystem can use differential pressure measurements over a length of the conduit to determine the friction. In some examples, the measurement subsystem includes a conduit that communicates fracture treatment fluid from a pump system toward a well system during the hydraulic fracture treatment. The conduit has an exterior surface and an interior surface, and the interior surface defines a central bore of the conduit that communicates the fracture treatment fluid toward the well system. The conduit may also have a plurality of internal flow channels that are used for measurement. For example, each channel may extend from an interior port defined by the interior surface to an exterior port defined by the exterior surface. One of the interior ports can be positioned a distance downstream from another, and the measurement subsystem may include a differential pressure sensor that measures a pressure difference between their associated exterior ports during the hydraulic fracture treatment. The measurement subsystem may also include a control unit that determines a friction of the fracture treatment fluid based on the pressure difference and the distance (e.g., the pressure difference may be divided by the distance, or the friction may be calculated in another manner).

Hydraulic fracture treatments can be used to stimulate the production of hydrocarbon resources (e.g., oil, natural gas, etc.) from subterranean rock formations. During a fracture treatment, fracture treatment fluids are pumped under high pressure into the subterranean rock formation through a wellbore to fracture the formation and increase permeability and production from the formation. The fracture treatment fluid may include a proppant material such as, for example, sand, glass beads, ceramic material, bauxite, dry powders, rock salt, benzoic acid, fiber material, cement plastics, or other materials. In many systems, proppant is mixed with other additive materials such as, for example, friction-reducing compounds and other types of additives.

In some fracture treatment systems, water or another base fluid is mixed with the proppant and other additive materials to form the fracture treatment fluid, which is pumped through a conduit system to the well system. The fracture treatment fluid may experience friction (e.g., a resistance to flow) that causes a pressure drop over a given displacement in the conduit system. Friction can be based on the constituents of the fracture treatment fluid and their proportions, as well as other factors. The friction may vary as the fracture treatment fluid flows under pressure, such as in response to drag along internal surfaces of the fluid treatment delivery system. The friction may also vary as the fracture treatment fluid permeates into the subterranean formation. In some cases, friction-reducing compounds are added to the fracture treatment fluid, for example, to control the friction of the fracture treatment fluid in the well system, in the subterranean formation, etc.

In some implementations, parameters of a fracture treatment can be specified, for example, according to properties of the subterranean formation, properties of the well system, or a desired effect of the fracture treatment. For instance, material parameters (e.g., proppant, additives, other constituents) of the fracture treatment fluid as well as dynamic parameters (e.g., flow rate, pressure, fracture, etc.) may be specified for a hydraulic fracture treatment. A measurement subsystem can be used to monitor the parameters during the fracture treatment, for example, to achieve compliance with specifications, for post-treatment analysis, or for other purposes. In some cases, monitored values can be compared with target values during the fracture treatment, and the fracture treatment can be modified (e.g., in real time) in response to detected variances. For instance, friction-reducing compounds or other constituents can be increased or decreased when the variance exceeds a predetermined threshold.

FIG. 1 is a schematic diagram of an example hydraulic fracturing system 100. As shown in FIG. 1, the example hydraulic fracturing system 100 includes a measurement subsystem 101, a pump system 106, a well system 108 and a fracture treatment fluid source 116. The various components and subsystems of the hydraulic fracturing system 100, which may include pipes, hoses, tubes, fluid tanks, pumps, valves, motors, mixers, generators, transformers, computer systems, or other types of structures and equipment, can be deployed on trucks, trailers, mobile vehicles, immobile installations, skids, etc. The hydraulic fracturing system 100 may include additional features and subsystems, and the components of the hydraulic fracturing system 100 may be arranged in another manner.

In some implementations, the example hydraulic fracturing system 100 includes one or more control systems. The control systems can include one or more computing devices or systems associated with the measurement subsystem 101, the pump system 106, the well system 108, the fracture treatment fluid source 116, or other components of the hydraulic fracturing system 100. The control system may include computing devices or systems that are separate from the components shown in FIG. 1, for example, in a data van, at a remote data center or in the cloud.

In some implementations, the control system can monitor and control the fracture treatment applied by the hydraulic fracturing system 100. In some instances, the control system interfaces with controls of the hydraulic fracturing system 100. For example, the control system may initiate control signals that configure the measurement subsystem 101, the pump system 106, the well system 108, the fracture treatment fluid source 116, or other components of the hydraulic fracturing system 100 to execute aspects of a fracture treatment. The control system may receive data collected or generated by the hydraulic fracturing system 100, and the control system may process the data or otherwise use the data to select or modify parameters of a fracture treatment. The control system may initiate control signals that configure or reconfigure components of the hydraulic fracturing system 100 or other equipment based on selected or modified properties.

The example hydraulic fracturing system 100 may also include communication links that allow various components and subsystems of the hydraulic fracturing system 100 to communicate with each other. For example, the hydraulic fracturing system 100 may include communication links that allow the control systems to communicate with components of the measurement subsystem 101, the pump system, the well system 108, the fracture treatment fluid source 116, etc. The communication links may also allow communication with sensors or data collection apparatus, remote systems, equipment installed in the wellbore, and other devices and equipment. The communication links may include any type of communication channels or networks, for example, to facilitate communication via wireless or a wired network, the Internet, a WiFi network, a satellite network, or another type of data communication network.

The example fracture treatment fluid source 116 includes a blender system 118 that mixes constituents of the fracture treatment fluid 102, such as water 120, a proppant material 122, and a friction-reducing compound 124. The proppant material 122 may include particulate solids such as, for example, sand, glass beads, ceramic material, bauxite, dry powders, rock salt, benzoic acid, fiber material, cement plastics, or other materials. In some cases, the particulate solids may be coated with a curable resin, a pre-cured resin, a stress bond resin, or other adhesive compound. When mixed with water, the proppant material 122 may form a suspension in the fracture treatment fluid 102 that may be referred to as a "slurry", a "proppant slurry", or a "proppant gel". In some variations, the constituents of the fracture treatment fluid 102 include dispersants to control agglomeration of the particulate solids. In some variations, the constituents include friction-reducing compounds 124 (e.g., viscosity-enhancing additives) that can inhibit settling of the particulate solids and modify the flow behavior of the fracture treatment fluid 102. Examples of the friction-reducing compounds include polyacrylamide polymers, guar and guar derivates, and viscoelastic surfactants. Other constituents may be used.

The example pump system 106 includes multiple pumps 124 and a pump manifold 126. The pump manifold 126 is in fluid communication with the fracture treatment fluid source 116, and receives the fracture treatment fluid produced by the blender 118 of the fracture treatment fluid source 116. The pump manifold 126 is configured to connect the plurality of pumps 124 to a fluid flow path through the pump manifold 126. The plurality of pumps 124 are configured to increase a pressure of the fracture treatment fluid 102 along the fluid flow path. As such, an outlet pressure of the fracture treatment fluid 102 when exiting the pump manifold 126 is greater than an inlet pressure of the fracture treatment fluid 102 when entering the pump manifold 126. For illustration purposes, in some examples, the fracture treatment fluid 102 may exit the fracture treatment fluid source 116 at or around 100 psi, and the fracture treatment fluid 102 may exit the pump system 106 at or above 15,000 psi. The plurality of pumps 124 may be implemented using any suitable type of hydraulic fracturing pumps, including electric-powered pumps or diesel-powered pumps.

The example hydraulic fracturing system 100 includes a means for determining a friction of the fracture treatment fluid between the pump system 106 and the well system 108. The example measurement subsystem 101 includes a conduit 104, a differential pressure sensor 112 and a control unit 114. The measurement subsystem 101 may include additional or different components, and the components may be configured as shown or in another manner.

Figure 2A:
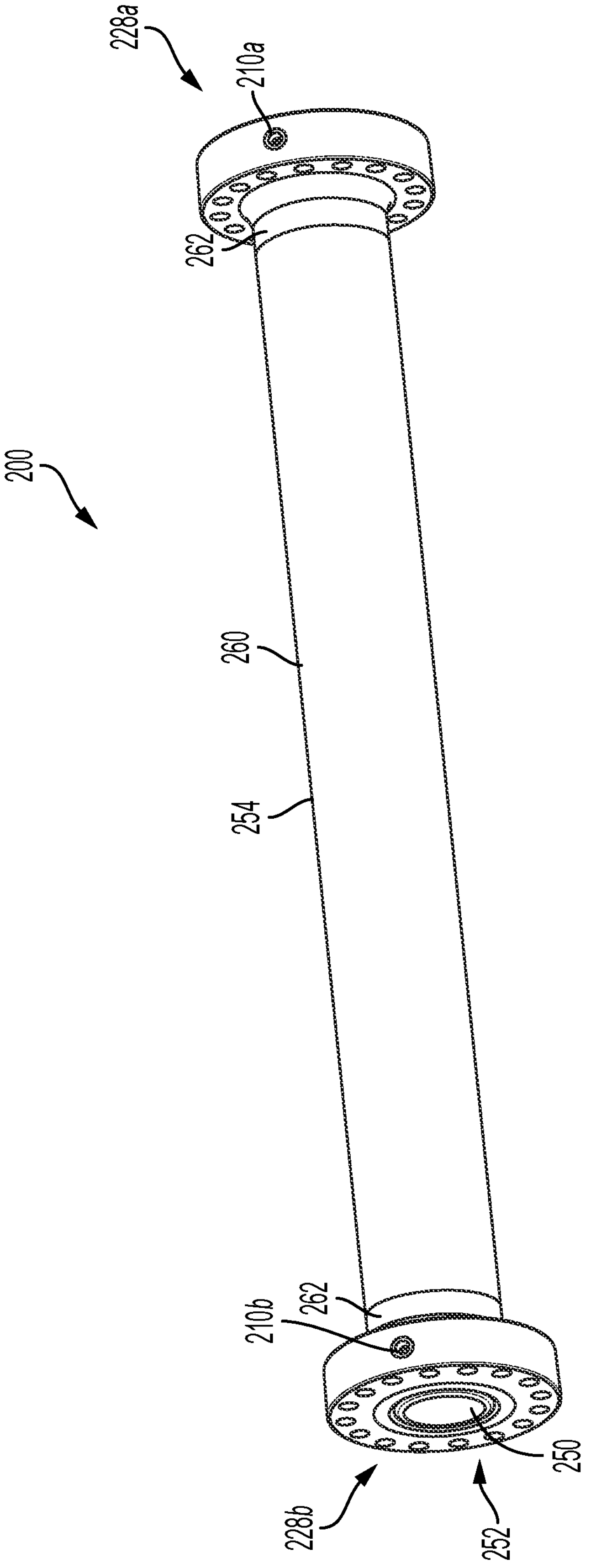
FIG. 2A is a schematic diagram, in perspective view, of an example conduit for monitoring the friction of a fracture treatment fluid.
Figure 2B:
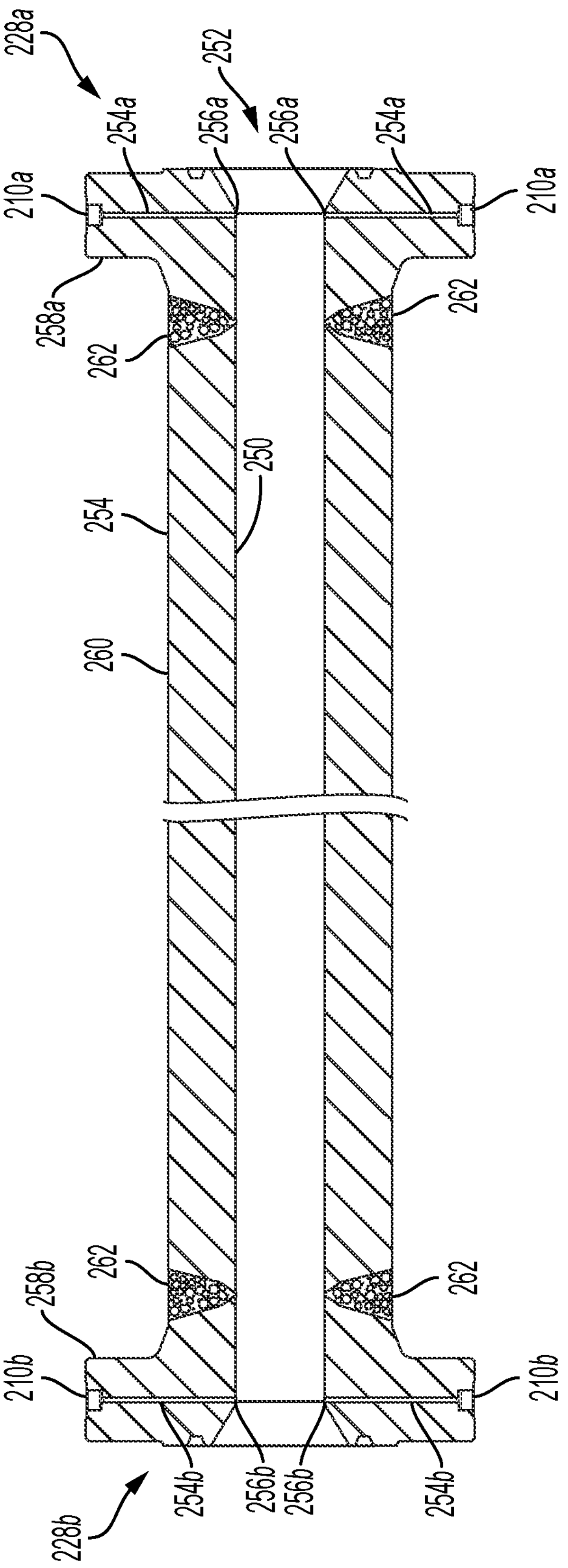
FIG. 2B is a schematic diagram, in cross-section view, of the example conduit of FIG. 2A.

The example conduit shown in FIG. 1 communicates the fracture treatment fluid 102 from the pump system 106 toward the well system 108 during the hydraulic fracture treatment. A first end 128*a* of the conduit 104 receives the fracture treatment fluid 102 from the pump system 106, and a second end 128*b* of the conduit 104 communicates the fracture treatment fluid 102 to the pump system 106. The conduit 104 has first and second exterior ports 110*a*, 110*b* that are positioned along the conduit 104 such that the second exterior port 110*b* is downstream of the first exterior port 110*a*. The conduit 104 may be implemented as shown in FIGS. 2A-2B or in another manner. The conduit 104 includes an interior surface that defines the central bore through the conduit 104, and the conduit 104 also includes first and second channels. The first channel extends from a first interior port defined by the interior surface to the first exterior port 110*a*. The second channel extends from a second interior port defined by the interior surface to the second exterior port 110*b*. The second interior port is positioned a distance downstream from the first interior port.

The example hydraulic fracturing system 100 also includes a differential pressure sensor 112 that measures a pressure difference between the first and second exterior ports 110*a*, 110*b* of the conduit 104 during the hydraulic fracture treatment. An example of the differential pressure sensor 112 is the conventional Rosemount™ 3051SHP pressure transmitter from Emerson Electric Company. The example system 100 additionally includes a control unit 114 that determines a friction of the fracture treatment fluid based on the pressure difference and the distance between the interior ports. In some variations, the control unit 114 communicates with, or is deployed as part of, a control system in the hydraulic fracturing system 100. For instance, the control unit 114 of the measurement subsystem 101 may communicate with a data truck or another type of control system.

In some implementations, the control unit 114 and other control systems in the hydraulic fracturing system 100 include one or more data processors that perform operations by executing software, firmware or another type of computer code or machine-readable instructions. The data processors can include any type of data processing apparatus such as, for example, general-purpose microprocessors, electronic controllers, special-purpose logic circuitry, etc. Software or other computer programs may generally be written in any form of programming language, and may be executed on one computer or on multiple computers that are located at one site or distributed across multiple sites and interconnected by a communication network.

The example well system 108 includes one or more wellbores in a subterranean region. The well system 108 may include any combination of horizontal, vertical, slant, curved, or other wellbore orientations. The subterranean region may include a rock formation that contains hydrocarbon resources, such as oil, natural gas, or others. For example, the subterranean region may include shale, coal, sandstone, granite, or others. The well system 108 can communicate fracturing fluid into the subterranean region, for example, through conduits installed in the wellbores. The conduits may include casing cemented to the walls of the wellbore, or other types of conduit such as sectioned pipe or coiled tubing. In some implementations, all or a portion of the wellbores may be left open, without casing.

As shown in FIG. 1, the example well system 108 includes a plurality of well heads 130 and a well manifold 132. The well manifold 132 is in fluid communication with the conduit 104 and receives the fracture treatment fluid 102 from the conduit 104. Moreover, in some variations, the well manifold 132 is configured to connect the plurality of well heads 130 to a fluid flow path through the well manifold 132. In these variations, the well manifold 132 may be configured to supply the fracture treatment fluid 102 from the conduit 104 to each well head 130 to be communicated into the respective wellbores.

In some implementations, the plurality of well heads 130 are associated with wellbores that each have a casing therein. The casing in the wellbore may have an inner diameter (e.g., 4.67 inches, 4.548 inches, etc.), and the diameter of the central bore in the conduit 104 may be selected to match the inner diameter of the casing in the wellbore. For example, the diameters may be the same or within a specified tolerance of each other. In some variations, the diameter of the central bore is within ±10% of the inner diameter of the casing. In further variations, the diameter of the central bore is within ±5% of the inner diameter of the casing. Other tolerances are possible, including tolerances in dimensional units (e.g., inches, centimeters, etc.).

During operation, the measurement subsystem 101 monitors the friction of the fracture treatment fluid 102 between the pump system 106 and the well system 108. The example hydraulic fracturing system 100 may include a first conduit system that communicates the fracture treatment fluid 102 from the pump system 106 to an inlet of the conduit 104. The inlet may be located at the first end 128*a* of the conduit 104, and in some variations, may be defined by a flange (e.g., the first flange 258*a* shown in FIGS. 2A-2B). The example system 100 may also include a second conduit system that communicates the fracture treatment fluid 102 from an outlet of the conduit 104 to the well system 108. The outlet may be located at the second end 128*b* of the conduit 104, and in some variations, may also be defined by a flange (e.g., the second flange 258*b* shown in FIGS. 2A-2B). The first and second conduit systems may each include one or more pipes or other types of conduits that are coupled to each other to define a fluid flow path for the fracture treatment fluid 102.

During a hydraulic fracture treatment, as the example system 100 communicates the fracture treatment fluid 102 through the central bore of the conduit 104 between the pump system 106 and the well system 108, the measurement subsystem 101 measures a pressure difference between the first and second exterior ports 110*a*, 110*b* of the conduit 104. The measurement is performed by the differential pressure sensor 112. For example, the differential pressure sensor 112 may include measurement ports that are connected (e.g., by tubes or hoses) to the first and second exterior ports 110*a*, 110*b* of the conduit 104. In the example shown in FIG. 1, the control unit 114 determines the friction of the fracture treatment fluid 102 based on the pressure difference and the distance between the first and second interior ports of the conduit 104. The friction can be specified in units of pressure over length (e.g., psi/ft. or other units) or other appropriate units in some cases. As such, the friction can be calculated as the differential pressure (measured by the differential pressure sensor 112) divided by the distance between first and second interior ports of the conduit 104. In some cases, the calculation can be modified or adjusted, for example, to account for physical features of the conduit 104 or other factors.

In some cases, the proportions of fracture treatment fluid constituents may be controlled by a control system, such as to control the friction of the fracture treatment fluid 102 during the fracture treatment. In some cases, the control system receives the measured value of the friction (e.g., from the control unit 114) and controls the fracture treatment fluid source 116 to maintain the friction at or near a target value (e.g., to keep the friction below an upper threshold and above a lower threshold) or to modify the friction toward a target range. In some implementations, the fracture treatment fluid source 116 includes one or more additive pumps that control the flow rate of friction-reducing compounds 124 into the blender 118, and the control signals from the control system can control the additive pumps to increase or decrease the flow rate of friction-reducing compound 124. For example, the control system may send a control signal (e.g., via one or more communication links) to the fracture treatment fluid source 116 in response to detecting that the friction of the fracture treatment fluid 102 is above an upper threshold. The fracture treatment fluid source 116 may then increase a proportion of the friction-reducing compound 124 in the fracture treatment fluid 102 in response to receiving the control signal. As another example, the control system may send a control signal (e.g., via one or more communication links) to the fracture treatment fluid source 116 in response to detecting that the friction of the fracture treatment fluid 102 is below a lower threshold. The fracture treatment fluid source 116 may then decrease a proportion of the friction-reducing compound 124 in the fracture treatment fluid 102 in response to receiving the control signal.

During operation of the example system 100, the blender system 118 may blend the water 120, the proppant material 122, and the friction-reducing compound 124 to produce the fracture treatment fluid 102. Moreover, the pump system 106 pumps the fracture treatment fluid 102 from the fracture treatment fluid source 116 through the pump manifold 126 toward the first end 128*a* of the conduit 104. The example system 100 may then communicate the fracture treatment fluid 102 from the pump system 106 to the inlet of the conduit 104, through the central bore of the conduit 104, from the outlet of the conduit 104 to the well system 108. As such, the well system 108 may receive, at the well manifold 132, the fracture treatment fluid 102 from the second end 128*b* of the conduit 104. The well system 108 may also transfer the received fracture treatment fluid through the well manifold 132 towards the plurality of well heads 130, into the associated wellbores to fracture the subterranean formation.

FIG. 2A presents a schematic diagram, in perspective view, of an example conduit 200 having first and second exterior ports 210*a*, 210*b* for monitoring the friction of a fracture treatment fluid. The example conduit 200 can be deployed in a hydraulic fracturing system, for example, as the conduit 104 described in FIG. 1, or in another type of system. FIG. 2B presents a schematic diagram, in cross-section view, of the example conduit of FIG. 2A.

The example conduit 200 includes an interior surface 250 that defines a central bore 252 that is configured to communicate fracture treatment fluid from a pump system toward a well system. The example conduit 200 also includes first and second channels 254*a*, 254*b*. The first channel 254*a* extends from a first interior port 256*a* defined by the interior surface 250 to the first exterior port 210*a*, which is defined by an exterior surface of 252 the conduit 200. The second channel 245*b* extends from a second interior port 256*b* defined by the interior surface 250 to the second exterior port 210*b*, which is also defined by the exterior surface 254. The second interior port 256*b* is positioned a distance downstream from the first interior port 256*a*. In some variations, such as shown in FIGS. 2A-2B, the second exterior port 210*b* is positioned a distance downstream from the first exterior port 210*a*.

FIGS. 2A-2B depict the example conduit 200 as having a pair of first channels 254*a* and a pair of second channels 254*b* (including their respective interior and exterior ports 210, 256). However, other numbers of first and second channels 254*a*, 254*b* are possible, 254*b*, including their respective interior and exterior ports 210, 256. For example, the example conduit 200 could have a single instance of each channel and their respective interior and exterior ports. As another example, the example conduit 200 could have a single instance of the first channel 254*a* and its respective interior and exterior ports 256*a*, 210*a* as well as two instances of the second channel 254*b* and its respective interior and exterior ports 256*b*, 210*b*. In this case, the interior ports 256*b* of the second channel 254*b* are positioned a distance downstream from the interior ports 256*a* of the second channel 254*b*. However, the exterior ports 210*b* of the second channel 254*b* may also be positioned a distance downstream from the exterior ports 210*a* of the second channel 254*b*.

In some implementations, the example conduit 200 is configured as a pipe spool. The pipe spool includes first and second flanges 258*a*, 258*b* at, respectively, first and second ends 228*a*, 228*b* of the pipe spool. The first and second flanges 258*a*, 258*b* may, in some variations, be coupled to a pipe portion 260 of the example conduit 200 by welds 262 proximate the first and second ends 228*a*, 228*b*. In these implementations, the first and second channels 254*a*, 254*b* extend through, respectively, the first and second flanges 258*a*, 258*b*.

In some aspects of what is described, a system may be described by the following examples. The system may, in certain cases, be used for monitoring friction of a fracture treatment fluid during a hydraulic fracture treatment.

Example 1. A system for monitoring friction of a fracture treatment fluid during a hydraulic fracture treatment, the system comprising:

- a conduit that communicates the fracture treatment fluid from a pump system toward a well system during the hydraulic fracture treatment, the conduit comprising:
  - an interior surface that defines a central bore that communicates the fracture treatment fluid toward the well system,
  - an exterior surface,
  - a first channel that extends from a first interior port defined by the interior surface to a first exterior port defined by the exterior surface, and
  - a second channel that extends from a second interior port defined by the interior surface to a second exterior port defined by the exterior surface, the second interior port positioned a distance downstream from the first interior port;
- a differential pressure sensor that measures a pressure difference between the first and second exterior ports of the conduit during the hydraulic fracture treatment; and
- a control unit that determines a friction of the fracture treatment fluid based on the pressure difference and the distance.

Example 2. The system of example 1, comprising:

- a fracture treatment fluid source; and
- the pump system, comprising a plurality of pumps and a pump manifold that connects the plurality of pumps, wherein the pump manifold is in fluid communication with the fracture treatment fluid source and a first end of the conduit.

Example 3. The system of example 2, wherein the fracture treatment fluid source comprises a blender system and configured to blend at least water, a proppant material, and a friction-reducing compound to produce the fracture treatment fluid.

Example 4. The system of example 3,

- wherein a control system is configured to send a first control signal to the fracture treatment fluid source in response to detecting that the friction of the fracture treatment fluid is above an upper threshold; and
- wherein the fracture treatment fluid source is configured to increase a proportion of the friction-reducing compound in the fracture treatment fluid in response to receiving the first control signal.

Example 5. The system of any one of examples 2-4,

- wherein a control system is configured to transmit a second control signal to the fracture treatment fluid source in response to detecting that the friction of the fracture treatment fluid is below a lower threshold; and
- wherein the fracture treatment fluid source is configured to decrease a proportion of the friction-reducing compound in the fracture treatment fluid in response to receiving the second control signal.

Example 6. The system of example 1 or any one of examples 2-5, wherein the well system comprises a plurality of well heads and a well manifold that connects the plurality of well heads, and the well manifold is in fluid communication with a second end of the conduit.

Example 7. The system of example 1 or any one of examples 2-6,

- wherein the well system comprises a plurality of wellbores each having a casing therein; and
- wherein a diameter of the central bore through the conduit matches an inner diameter of the casing.

Example 8. The system of example 1 or any one of examples 2-7, wherein the conduit is a pipe spool comprising first and second flanges at, respectively, first and second ends of the pipe spool; and wherein the first and second channels extend through, respectively, the first and second flanges.

Example 9. The system of example 1 or any one of examples 2-8s, comprising:

a first conduit system that communicates the fracture treatment fluid from the pump system to an inlet of the conduit; and a second conduit system that communicates the fracture treatment fluid from an outlet of the conduit to the well system.

In some aspects of what is described, a method may be described by the following examples. The method may, in certain cases, be used for monitoring friction of a fracture treatment fluid during a hydraulic fracture treatment.

Example 10. A method for monitoring friction of a fracture treatment fluid during a hydraulic fracture treatment, the method comprising:

communicating fracture treatment fluid through a central bore of a conduit between a pump system and a well system during the hydraulic fracture treatment, the conduit comprising:

an interior surface that defines the central bore that communicates the fracture treatment fluid toward the well system, an exterior surface, a first channel that extends from a first interior port defined by the interior surface to a first exterior port defined by the exterior surface, and a second channel that extends from a second interior port defined by the interior surface to a second exterior port defined by the exterior surface, the second interior port positioned a distance downstream from the first interior port;

measuring a pressure difference between the first and second exterior ports of the conduit during the hydraulic fracture treatment; and determining, by operation of a control unit, a friction of the fracture treatment fluid based on the pressure difference and the distance.

Example 11. The method of example 10, wherein the conduit comprises a first end in fluid communication with a pump manifold of a pump system, the pump system comprising a plurality of pumps connected by the pump manifold; and wherein method comprises pumping, by operation of the plurality of pumps, the fracture treatment fluid from a fracture treatment fluid source through the pump manifold toward the first end of the conduit.

Example 12. The method of example 11, wherein the fracture treatment fluid source comprises a blender system; and wherein the method comprises blending at least water, a proppant material, and a friction-reducing compound to produce the fracture treatment fluid. The blender system may be in communication with the control unit.

Example 13. The method of example 12, comprising:

sending a first control signal to the fracture treatment fluid source in response to detecting that the friction of the fracture treatment fluid is above an upper threshold; and increasing a proportion of the friction-reducing compound in the fracture treatment fluid in response to receiving the first control signal.

Example 14. The method of any one of examples 12-13, comprising:

sending a second control signal to the fracture treatment fluid source in response to detecting that the friction of the fracture treatment fluid is below a lower threshold; and decreasing a proportion of the friction-reducing compound in the fracture treatment fluid in response to receiving the second control signal.

Example 15. The method of example 10 or any one of examples 11-14, wherein the conduit comprises a second end in fluid communication with a well manifold of the well system, the well system comprising a plurality of wells connected by the well manifold; and wherein the method comprises:

receiving, at the well manifold, the fracture treatment fluid from the second end of the conduit, and transferring the received fracture treatment fluid through the well manifold towards the plurality of wells.

Example 16. The method of example 10 or any one of examples 11-15, wherein the well system comprises a plurality of wellbores each having a casing therein; and wherein a diameter of the central bore through the conduit matches an inner diameter of the casing.

Example 17. The method of example 10 or any one of examples 11-16, wherein the conduit is a pipe spool comprising first and second flanges at, respectively, first and second ends of the pipe spool; and wherein the first and second channels extend through, respectively, the first and second flanges.

Example 18. The method of example 10 or any one of examples 11-17, comprising:

communicating, through a first conduit system, the fracture treatment fluid from the pump system to an inlet of the conduit; and communicating, through a second conduit system, the fracture treatment fluid from an outlet of the conduit to the well system.

In some aspects of what is described, a hydraulic fracturing system may be described by the following examples.

Example 19. A hydraulic fracturing system comprises: a fracture treatment fluid source configured to produce fracture treatment fluid for a hydraulic fracture treatment; a pump system that receives the fracture treatment fluid and pumps the fracture treatment fluid toward a well system; and means for determining a friction of the fracture treatment fluid between the pump system and the well system.

Example 20. The hydraulic fracturing system of example 19, wherein the means for determining a friction of the fracture treatment fluid comprises a control unit that communicates with a control system.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A system for monitoring friction of a fracture treatment fluid during a hydraulic fracture treatment, the system comprising:

a conduit that communicates the fracture treatment fluid from a pump system toward a well system during the hydraulic fracture treatment, the conduit comprising:

an interior surface that defines a central bore that communicates the fracture treatment fluid toward the well system, an exterior surface, a first channel that extends from a first interior port defined by the interior surface to a first exterior port defined by the exterior surface, and a second channel that extends from a second interior port defined by the interior surface to a second exterior port defined by the exterior surface, the second interior port positioned a distance downstream from the first interior port;

a differential pressure sensor that measures a pressure difference between the first and second exterior ports of the conduit during the hydraulic fracture treatment; and a control unit that determines a friction of the fracture treatment fluid based on the pressure difference and the distance.

2. The system of claim 1, comprising:

a fracture treatment fluid source; and the pump system, comprising a plurality of pumps and a pump manifold that connects the plurality of pumps, wherein the pump manifold is in fluid communication with the fracture treatment fluid source and a first end of the conduit.

3. The system of claim 2, wherein the fracture treatment fluid source comprises a blender system configured to blend at least water, a proppant material, and a friction-reducing compound to produce the fracture treatment fluid.

4. The system of claim 3, comprising a control system configured to send a first control signal to the fracture treatment fluid source in response to detecting that the friction of the fracture treatment fluid is above an upper threshold; and wherein the fracture treatment fluid source is configured to increase a proportion of the friction-reducing compound in the fracture treatment fluid in response to receiving the first control signal.

5. The system of claim 3, comprising a control system configured to send a second control signal to the fracture treatment fluid source in response to detecting that the friction of the fracture treatment fluid is below a lower threshold; and wherein the fracture treatment fluid source is configured to decrease a proportion of the friction-reducing compound in the fracture treatment fluid in response to receiving the second control signal.

6. The system of claim 2, wherein the well system comprises a plurality of well heads and a well manifold that connects the plurality of well heads, and the well manifold is in fluid communication with a second end of the conduit.

7. The system of claim 1, wherein the well system comprises a plurality of wellbores each having a casing therein; and wherein a diameter of the central bore through the conduit matches an inner diameter of the casing.

8. The system of claim 1, wherein the conduit is a pipe spool comprising first and second flanges at, respectively, first and second ends of the pipe spool; and wherein the first and second channels extend through, respectively, the first and second flanges.

9. The system of claim 1, comprising:

a first conduit system that communicates the fracture treatment fluid from the pump system to an inlet of the conduit; and a second conduit system that communicates the fracture treatment fluid from an outlet of the conduit to the well system.

10. A method for monitoring friction of a fracture treatment fluid during a hydraulic fracture treatment, the method comprising:

communicating fracture treatment fluid through a central bore of a conduit between a pump system and a well system during the hydraulic fracture treatment, the conduit comprising:

an interior surface that defines the central bore that communicates the fracture treatment fluid toward the well system, an exterior surface, a first channel that extends from a first interior port defined by the interior surface to a first exterior port defined by the exterior surface, and a second channel that extends from a second interior port defined by the interior surface to a second exterior port defined by the exterior surface, the second interior port positioned a distance downstream from the first interior port;

measuring a pressure difference between the first and second exterior ports of the conduit during the hydraulic fracture treatment; and determining, by operation of a control unit, a friction of the fracture treatment fluid based on the pressure difference and the distance.

11. The method of claim 10, wherein the conduit comprises a first end in fluid communication with a pump manifold of a pump system, the pump system comprising a plurality of pumps connected by the pump manifold; and wherein method comprises pumping, by operation of the plurality of pumps, the fracture treatment fluid from a fracture treatment fluid source through the pump manifold toward the first end of the conduit.

12. The method of claim 11,
wherein the fracture treatment fluid source comprises a blender system; and
wherein the method comprises blending at least water, a proppant material, and a friction-reducing compound to produce the fracture treatment fluid.

13. The method of claim 12, comprising:
sending a first control signal to the fracture treatment fluid source in response to detecting that the friction of the fracture treatment fluid is above an upper threshold; and
increasing, by operation of the fracture treatment fluid source, a proportion of the friction-reducing compound in the fracture treatment fluid in response to receiving the first control signal.

14. The method of claim 13, comprising:
sending a second control signal to the fracture treatment fluid source in response to detecting that the friction of the fracture treatment fluid is below a lower threshold; and
decreasing, by operation of the fracture treatment fluid source, a proportion of the friction-reducing compound in the fracture treatment fluid in response to receiving the second control signal.

15. The method of claim 11,
wherein the conduit comprises a second end in fluid communication with a well manifold of the well system, the well system comprising a plurality of wells connected by the well manifold; and
wherein the method comprises:
receiving, at the well manifold, the fracture treatment fluid from the second end of the conduit, and
transferring the received fracture treatment fluid through the well manifold towards the plurality of wells.

16. The method of claim 10,
wherein the well system comprises a plurality of wellbores each having a casing therein; and
wherein a diameter of the central bore through the conduit matches an inner diameter of the casing.

17. The method of claim 10,
wherein the conduit is a pipe spool comprising first and second flanges at, respectively, first and second ends of the pipe spool; and
wherein the first and second channels extend through, respectively, the first and second flanges.

18. The method of claim 10, comprising:
communicating, through a first conduit system, the fracture treatment fluid from the pump system to an inlet of the conduit; and
communicating, through a second conduit system, the fracture treatment fluid from an outlet of the conduit to the well system.

* * * * *